United States Patent
Li et al.

(10) Patent No.: US 10,871,921 B2
(45) Date of Patent: Dec. 22, 2020

(54) METHOD AND SYSTEM FOR FACILITATING ATOMICITY ASSURANCE ON METADATA AND DATA BUNDLED STORAGE

(71) Applicant: Alibaba Group Holding Limited, Grand Cayman (KY)

(72) Inventors: Shu Li, Bothell, WA (US); Ping Zhou, Folsom, CA (US)

(73) Assignee: Alibaba Group Holding Limited, George Town (KY)

( * ) Notice: Subject to any disclaimer, the term of this patent is extended or adjusted under 35 U.S.C. 154(b) by 29 days.

(21) Appl. No.: 16/201,353

(22) Filed: Nov. 27, 2018

(65) Prior Publication Data

US 2020/0034079 A1 Jan. 30, 2020

Related U.S. Application Data

(60) Provisional application No. 62/712,133, filed on Jul. 30, 2018.

(51) Int. Cl.
  *G06F 3/06* (2006.01)
  *G06F 16/23* (2019.01)
  *G06F 12/10* (2016.01)

(52) U.S. Cl.
  CPC .......... *G06F 3/0659* (2013.01); *G06F 3/0619* (2013.01); *G06F 3/0673* (2013.01);
  (Continued)

(58) Field of Classification Search
  None
  See application file for complete search history.

(56) References Cited

U.S. PATENT DOCUMENTS 4,775,932 A  10/1988 Oxley
5,930,167 A   7/1999 Lee
(Continued)

FOREIGN PATENT DOCUMENTS

JP   2003022209   1/2003
JP   2011175422   9/2011
(Continued)

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Charles J Choi
(74) *Attorney, Agent, or Firm* — Shun Yao; Park, Vaughan, Fleming & Dowler LLP

(57) ABSTRACT

One embodiment facilitates atomicity assurance for storing data and metadata in a data stream. The system receives a first stream of data to be written to a storage device, wherein the first stream includes a plurality of I/O requests associated with data and corresponding metadata. In response to determining that residual data associated with a preceding I/O request of the first stream exists in a data buffer: the system appends, to the residual data, a first portion of data from a current I/O request to obtain a first page of data; the system writes a remainder portion of the current I/O request to the data buffer to obtain current residual data; and the system writes the first page of data to the storage device. Thus, the system thereby facilitates atomicity assurance for storing the data and corresponding metadata of each I/O request of the first data stream.

20 Claims, 11 Drawing Sheets

(52) U.S. Cl.
CPC .......... *G06F 12/10* (2013.01); *G06F 16/2379* (2019.01); *G06F 2212/1044* (2013.01); *G06F 2212/657* (2013.01)

(56) References Cited

U.S. PATENT DOCUMENTS

| | | | |
|---|---|---|---|
| 6,148,377 | A | 11/2000 | Carter |
| 6,226,650 | B1 | 5/2001 | Mahajan et al. |
| 7,565,454 | B2 | 7/2009 | Zuberi |
| 7,958,433 | B1 | 6/2011 | Yoon |
| 8,085,569 | B2 | 12/2011 | Kim |
| 8,144,512 | B2 | 3/2012 | Huang |
| 8,166,233 | B2 | 4/2012 | Schibilla |
| 8,260,924 | B2 | 9/2012 | Koretz |
| 8,281,061 | B2 | 10/2012 | Radke |
| 8,452,819 | B1 | 5/2013 | Sorenson, III |
| 8,516,284 | B2 | 8/2013 | Chan |
| 8,751,763 | B1 | 6/2014 | Ramarao |
| 8,825,937 | B2 | 9/2014 | Atkisson |
| 9,043,545 | B2 | 5/2015 | Kimmel |
| 9,088,300 | B1 | 7/2015 | Chen |
| 9,092,223 | B1 | 7/2015 | Pani |
| 9,280,472 | B1 | 3/2016 | Dang |
| 9,280,487 | B2 | 3/2016 | Candelaria |
| 9,436,595 | B1 | 9/2016 | Benitez |
| 9,529,601 | B1 | 12/2016 | Dharmadhikari |
| 9,588,698 | B1 | 3/2017 | Karamcheti |
| 9,588,977 | B1 | 3/2017 | Wang |
| 10,013,169 | B2 | 7/2018 | Fisher |
| 10,229,735 | B1 | 3/2019 | Natarajan |
| 10,235,198 | B2 | 3/2019 | Qiu |
| 2002/0010783 | A1 | 1/2002 | Primak |
| 2002/0073358 | A1 | 6/2002 | Atkinson |
| 2002/0161890 | A1 | 10/2002 | Chen |
| 2003/0163594 | A1 | 8/2003 | Aasheim |
| 2003/0163633 | A1 | 8/2003 | Aasheim |
| 2003/0217080 | A1* | 11/2003 | White .................... G06F 3/061 |
| 2004/0010545 | A1 | 1/2004 | Pandya |
| 2004/0103238 | A1 | 5/2004 | Avraham |
| 2004/0255171 | A1 | 12/2004 | Zimmer |
| 2004/0268278 | A1 | 12/2004 | Hoberman |
| 2005/0038954 | A1 | 2/2005 | Saliba |
| 2005/0097126 | A1 | 5/2005 | Cabrera |
| 2005/0177755 | A1 | 8/2005 | Fung |
| 2005/0195635 | A1 | 9/2005 | Conley |
| 2005/0235067 | A1 | 10/2005 | Creta |
| 2005/0235171 | A1 | 10/2005 | Igari |
| 2006/0156012 | A1 | 7/2006 | Beeson |
| 2007/0033323 | A1 | 2/2007 | Gorobets |
| 2007/0061502 | A1 | 3/2007 | Lasser |
| 2007/0101096 | A1 | 5/2007 | Gorobets |
| 2007/0283081 | A1 | 12/2007 | Lasser |
| 2007/0285980 | A1 | 12/2007 | Shimizu |
| 2008/0034154 | A1 | 2/2008 | Lee |
| 2008/0112238 | A1 | 5/2008 | Kim |
| 2008/0301532 | A1 | 12/2008 | Uchikawa |
| 2009/0113219 | A1 | 4/2009 | Aharonov |
| 2009/0282275 | A1 | 11/2009 | Yermalayeu |
| 2009/0307249 | A1 | 12/2009 | Koifman |
| 2009/0310412 | A1 | 12/2009 | Jang |
| 2010/0169470 | A1 | 7/2010 | Takashige |
| 2010/0217952 | A1* | 8/2010 | Iyer .................... G06F 12/0897 711/209 |
| 2010/0229224 | A1 | 9/2010 | Etchegoyen |
| 2010/0325367 | A1 | 12/2010 | Kornegay |
| 2011/0055458 | A1 | 3/2011 | Kuehne |
| 2011/0055471 | A1 | 3/2011 | Thatcher |
| 2011/0099418 | A1 | 4/2011 | Chen |
| 2011/0153903 | A1 | 6/2011 | Hinkle |
| 2011/0161784 | A1 | 6/2011 | Selinger |
| 2011/0191525 | A1 | 8/2011 | Hsu |
| 2011/0218969 | A1 | 9/2011 | Anglin |
| 2011/0231598 | A1 | 9/2011 | Hatsuda |
| 2011/0292538 | A1 | 12/2011 | Haga |
| 2011/0299317 | A1 | 12/2011 | Shaeffer |
| 2011/0302353 | A1 | 12/2011 | Confalonieri |
| 2012/0084523 | A1 | 4/2012 | Littlefield |
| 2012/0117399 | A1 | 5/2012 | Chan |
| 2012/0147021 | A1 | 6/2012 | Cheng |
| 2012/0159289 | A1 | 6/2012 | Piccirillo |
| 2012/0210095 | A1 | 8/2012 | Nellans |
| 2012/0246392 | A1 | 9/2012 | Cheon |
| 2012/0278579 | A1 | 11/2012 | Goss |
| 2012/0284587 | A1 | 11/2012 | Yu |
| 2013/0061029 | A1 | 3/2013 | Huff |
| 2013/0073798 | A1 | 3/2013 | Kang |
| 2013/0080391 | A1 | 3/2013 | Raichstein |
| 2013/0145085 | A1 | 6/2013 | Yu |
| 2013/0145089 | A1 | 6/2013 | Eleftheriou |
| 2013/0151759 | A1 | 6/2013 | Shim |
| 2013/0159251 | A1 | 6/2013 | Skrenta |
| 2013/0166820 | A1 | 6/2013 | Batwara |
| 2013/0173845 | A1 | 7/2013 | Aslam |
| 2013/0191601 | A1 | 7/2013 | Peterson |
| 2013/0219131 | A1 | 8/2013 | Alexandron |
| 2013/0318283 | A1 | 11/2013 | Small |
| 2014/0019650 | A1* | 1/2014 | Li .............................. G06F 5/06 710/53 |
| 2014/0082273 | A1 | 3/2014 | Segev |
| 2014/0108414 | A1 | 4/2014 | Stillerman |
| 2014/0181532 | A1 | 6/2014 | Camp |
| 2014/0195564 | A1 | 7/2014 | Talagala |
| 2014/0233950 | A1 | 8/2014 | Luo |
| 2014/0250259 | A1 | 9/2014 | Ke |
| 2014/0279927 | A1 | 9/2014 | Constantinescu |
| 2014/0304452 | A1 | 10/2014 | De La Iglesia |
| 2014/0310574 | A1 | 10/2014 | Yu |
| 2014/0359229 | A1 | 12/2014 | Cota-Robles |
| 2014/0365707 | A1 | 12/2014 | Talagala |
| 2015/0019798 | A1 | 1/2015 | Huang |
| 2015/0082317 | A1 | 3/2015 | You |
| 2015/0106556 | A1 | 4/2015 | Yu |
| 2015/0106559 | A1 | 4/2015 | Cho |
| 2015/0142752 | A1 | 5/2015 | Chennamsetty |
| 2015/0227316 | A1 | 8/2015 | Warfield |
| 2015/0277937 | A1 | 10/2015 | Swanson |
| 2015/0301964 | A1 | 10/2015 | Brinicombe |
| 2015/0304108 | A1 | 10/2015 | Obukhov |
| 2015/0363271 | A1 | 12/2015 | Haustein |
| 2015/0372597 | A1 | 12/2015 | Luo |
| 2016/0014039 | A1 | 1/2016 | Reddy |
| 2016/0026575 | A1 | 1/2016 | Samanta |
| 2016/0048341 | A1 | 2/2016 | Constantinescu |
| 2016/0098344 | A1 | 4/2016 | Gorobets |
| 2016/0110254 | A1 | 4/2016 | Cronie |
| 2016/0162187 | A1* | 6/2016 | Lee .................... G06F 12/0246 711/103 |
| 2016/0179399 | A1 | 6/2016 | Melik-Martirosian |
| 2016/0203000 | A1 | 7/2016 | Parmar |
| 2016/0232103 | A1 | 8/2016 | Schmisseur |
| 2016/0239074 | A1 | 8/2016 | Lee |
| 2016/0239380 | A1 | 8/2016 | Wideman |
| 2016/0274636 | A1 | 9/2016 | Kim |
| 2016/0306853 | A1 | 10/2016 | Sabaa |
| 2016/0343429 | A1 | 11/2016 | Nieuwejaar |
| 2016/0350002 | A1 | 12/2016 | Vergis |
| 2016/0350385 | A1 | 12/2016 | Poder |
| 2016/0364146 | A1 | 12/2016 | Kuttner |
| 2017/0010652 | A1 | 1/2017 | Huang |
| 2017/0075583 | A1 | 3/2017 | Alexander |
| 2017/0075594 | A1 | 3/2017 | Badam |
| 2017/0109232 | A1 | 4/2017 | Cha |
| 2017/0147499 | A1 | 5/2017 | Mohan |
| 2017/0161202 | A1 | 6/2017 | Erez |
| 2017/0162235 | A1 | 6/2017 | De |
| 2017/0168986 | A1 | 6/2017 | Sajeepa |
| 2017/0212708 | A1 | 7/2017 | Suhas |
| 2017/0228157 | A1 | 8/2017 | Yang |
| 2017/0249162 | A1 | 8/2017 | Tsirkin |
| 2017/0262178 | A1 | 9/2017 | Hashimoto |
| 2017/0285976 | A1 | 10/2017 | Durham |
| 2017/0286311 | A1 | 10/2017 | Juenemann |
| 2017/0344470 | A1 | 11/2017 | Yang |
| 2017/0344491 | A1 | 11/2017 | Pandurangan |

(56) References Cited

U.S. PATENT DOCUMENTS

| | | |
|---|---|---|
| 2017/0353576 A1 | 12/2017 | Guim Bernat |
| 2018/0024772 A1 | 1/2018 | Madraswala |
| 2018/0024779 A1* | 1/2018 | Kojima ............... G06F 3/0659 711/103 |
| 2018/0088867 A1 | 3/2018 | Kaminaga |
| 2018/0107591 A1 | 4/2018 | Smith |
| 2018/0143780 A1 | 5/2018 | Cho |
| 2018/0167268 A1 | 6/2018 | Liguori |
| 2018/0189182 A1 | 7/2018 | Wang |
| 2018/0212951 A1 | 7/2018 | Goodrum |
| 2018/0270110 A1 | 9/2018 | Chugtu |
| 2018/0293014 A1 | 10/2018 | Ravimohan |
| 2018/0329776 A1 | 11/2018 | Lai |
| 2018/0356992 A1 | 12/2018 | Lamberts |
| 2018/0373428 A1 | 12/2018 | Kan |
| 2019/0012111 A1 | 1/2019 | Li |
| 2019/0073262 A1 | 3/2019 | Chen |
| 2019/0205206 A1 | 7/2019 | Hornung |

FOREIGN PATENT DOCUMENTS

| | | |
|---|---|---|
| WO | 9418634 | 8/1994 |
| WO | 1994018634 | 8/1994 |

OTHER PUBLICATIONS

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices" < FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pp..cs.wisc.edu/~remzi/OSTEP/.

* cited by examiner

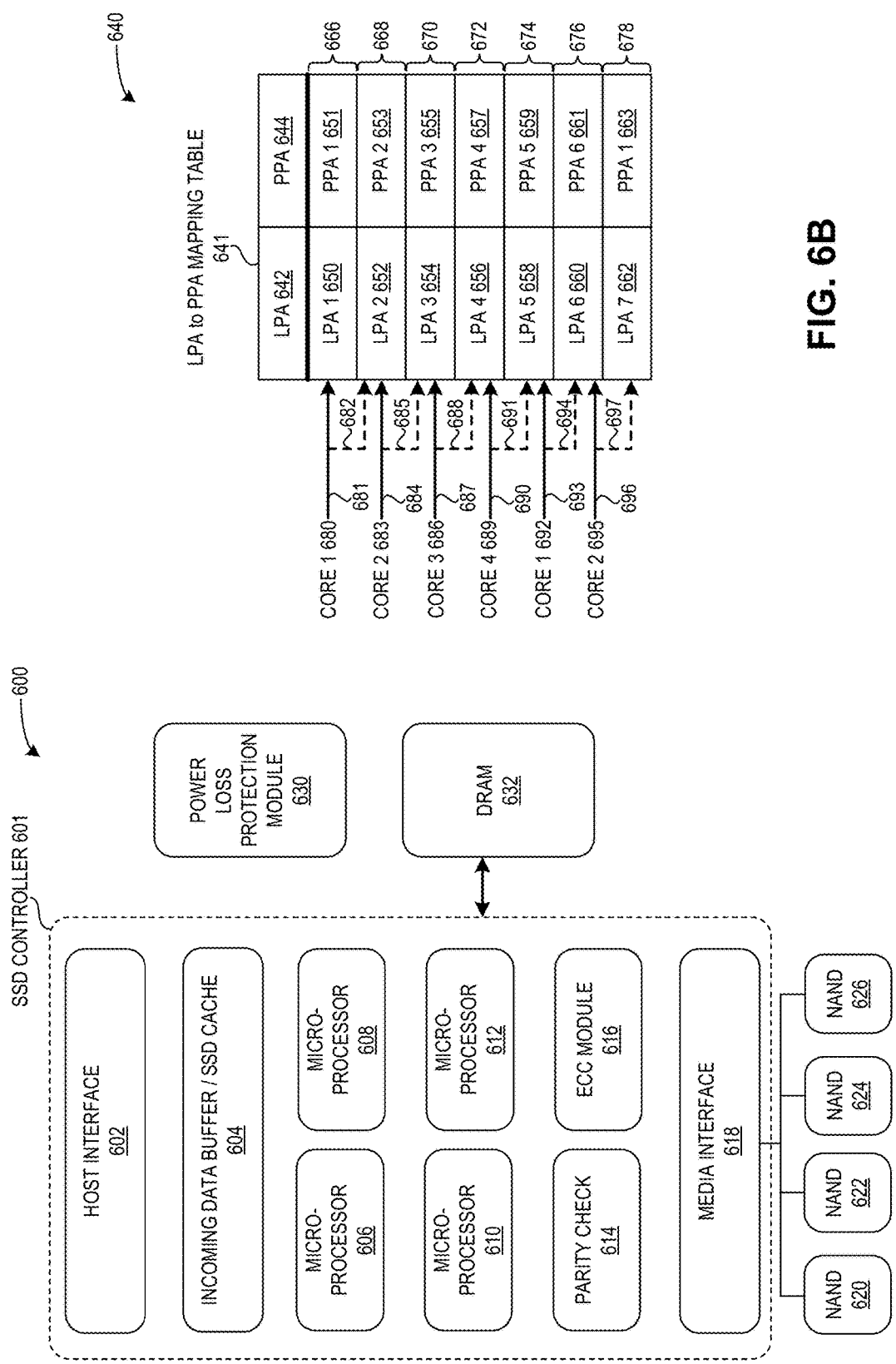

METHOD AND SYSTEM FOR FACILITATING ATOMICITY ASSURANCE ON METADATA AND DATA BUNDLED STORAGE

RELATED APPLICATION

This application claims the benefit of U.S. Provisional Application No. 62/712,133, titled "Method and System for Facilitating Atomicity Assurance on Metadata and Data Bundled Storage," by inventors Shu Li and Ping Zhou, filed 30 Jul. 2018, the disclosure of which is incorporated herein by reference in its entirety.

BACKGROUND

Field

This disclosure is generally related to the field of data storage. More specifically, this disclosure is related to a system and method for facilitating atomicity assurance on metadata and data bundled storage.

Related Art

The proliferation of the Internet and e-commerce continues to create a vast amount of digital content. Various storage systems and servers have been created to access and store such digital content. In cloud or clustered storage systems, multiple applications may share the underlying system resources (e.g., of a storage device). Managing the resources of a storage device is critical both for the performance of the system and to satisfy any Quality of Service (QoS) requirements. In conventional storage systems in the past, data and corresponding metadata (e.g., from an incoming input/output (I/O) request) were written separately, resulting in two separate I/O write operations to store the data and another two separate I/O read operations to subsequently access the data. To reduce the number of I/O operations and to increase both the performance and efficiency of the overall storage system, data and its corresponding metadata can be "bundled" together to provide atomicity assurance. However, bundling the data and metadata together results in an increase in the overall size or length of the data to be written (in one transaction), and the increased length typically does not align with a standard block size. This may create issues with the specific type of physical media relied upon and to which the bundled data is to be written.

In a prior generation of Not-And (NAND) flash (e.g., two-dimensional planar NAND flash, or 2D planar NAND), the system can accommodate metadata inserted into the same I/O request as the corresponding data by writing the data to a page region and by writing the corresponding metadata to an out of bound region for the page region. However, in the current generation of NAND flash (e.g., three-dimensional triple level cell NAND, or 3D TLC NAND), the out of bound region does not provide sufficient space in which to write the corresponding metadata.

Thus, in the current generation of storage devices, the issue remains of how to bundle data and its corresponding metadata to provide atomicity assurance for writing the bundle to a storage device.

SUMMARY

One embodiment facilitates atomicity assurance for storing data and metadata in a data stream. During operation, the system receives a first stream of data to be written to a storage device, wherein the first stream includes a plurality of I/O requests associated with data and corresponding metadata. In response to determining that residual data associated with a preceding I/O request of the first stream exists in a data buffer: the system appends, to the residual data, a first portion of data from a current I/O request to obtain a first page of data; the system writes a remainder portion of the current I/O request to the data buffer to obtain current residual data; and the system writes the first page of data to the storage device at a current physical page address (PPA). Thus, the system thereby facilitates atomicity assurance for storing the data and corresponding metadata of each I/O request of the first data stream.

In some embodiments, the first portion begins from a first logical page address (LPA) associated with a current write pointer in the current I/O request. The system sets the current write pointer to an end of the remainder portion. The system updates, in a data structure, an entry which maps the first logical page address to the current physical page address.

In some embodiments, in response to determining that residual data associated with the first stream does not exist in the data buffer, the system performs the following operations. The system writes, to the data buffer, a second portion of data from the current I/O request to obtain a second page of data, wherein the second portion begins from a second logical page address associated with a current write pointer in the current I/O request. The system writes the remainder portion of the current I/O request to the data buffer to obtain current residual data. The system sets the current write pointer to an end of the remainder portion. The system updates, in a data structure, an entry which maps the second logical page address to the current physical page address.

In some embodiments, subsequent to writing the remainder portion of the current I/O request to the data buffer, the system sends, to a host computing device from which the first stream of data is received, an acknowledgement that the current I/O request is successful.

In some embodiments, a beginning of the remainder portion in the current I/O request corresponds to a third logical page address. The system updates, in a data structure, an entry which maps the third logical page address to a next physical page address sequential to the current physical page address.

In some embodiments, in response to determining that the current residual data corresponds to an end of the first stream, the system performs the following operations. The system appends zeros to the current residual data to obtain a third page of data. The system writes the third page of data to the storage device at a next physical page address sequential to the current physical page address. The system updates, in a data structure, an entry which maps a fourth logical page address associated with the current residual data to the next physical page address. The system clears the current residual data in the data buffer.

In some embodiments, determining that the residual data corresponds to an end of the first stream comprises: receiving, by a first microprocessor of the storage device, a command to write the first page of data to the storage device; searching, in a data structure based on an logical page address associated with the first page, for the current physical page address to which to write the first page; executing the command by writing the first page to the storage device at the current physical page address; retrieving, from the data structure, a second physical page address corresponding to a next logical page address associated with the incoming I/O request; in response to determining that the second physical page address is null, setting an invalid physical page address as the second physical page address; waiting a pre-determined period of time; retrieving, from the data structure at a subsequent time, the second physical page address; in response to determining that the second physical page address has been updated and is null, determining that the residual data does not correspond to the end of the first stream; in response to determining that the second physical page address has not been updated, determining that the residual data corresponds to the end of the first stream; and in response to determining that the second physical page address has been updated and is not null, determining that the second physical page address has been trimmed and that the residual data corresponds to the end of the first stream.

In some embodiments, the system reports whether the residual data corresponds to the end of the first stream.

BRIEF DESCRIPTION OF THE FIGURES

FIG. 6A presents an exemplary architecture of a solid state drive, in accordance with an embodiment of the present application.

FIG. 6B presents an exemplary environment in which multiple microprocessors use an LPA to PPA mapping table to communicate regarding tail identification, in accordance with an embodiment of the present application.

In the figures, like reference numerals refer to the same figure elements.

DETAILED DESCRIPTION

Figure 1:
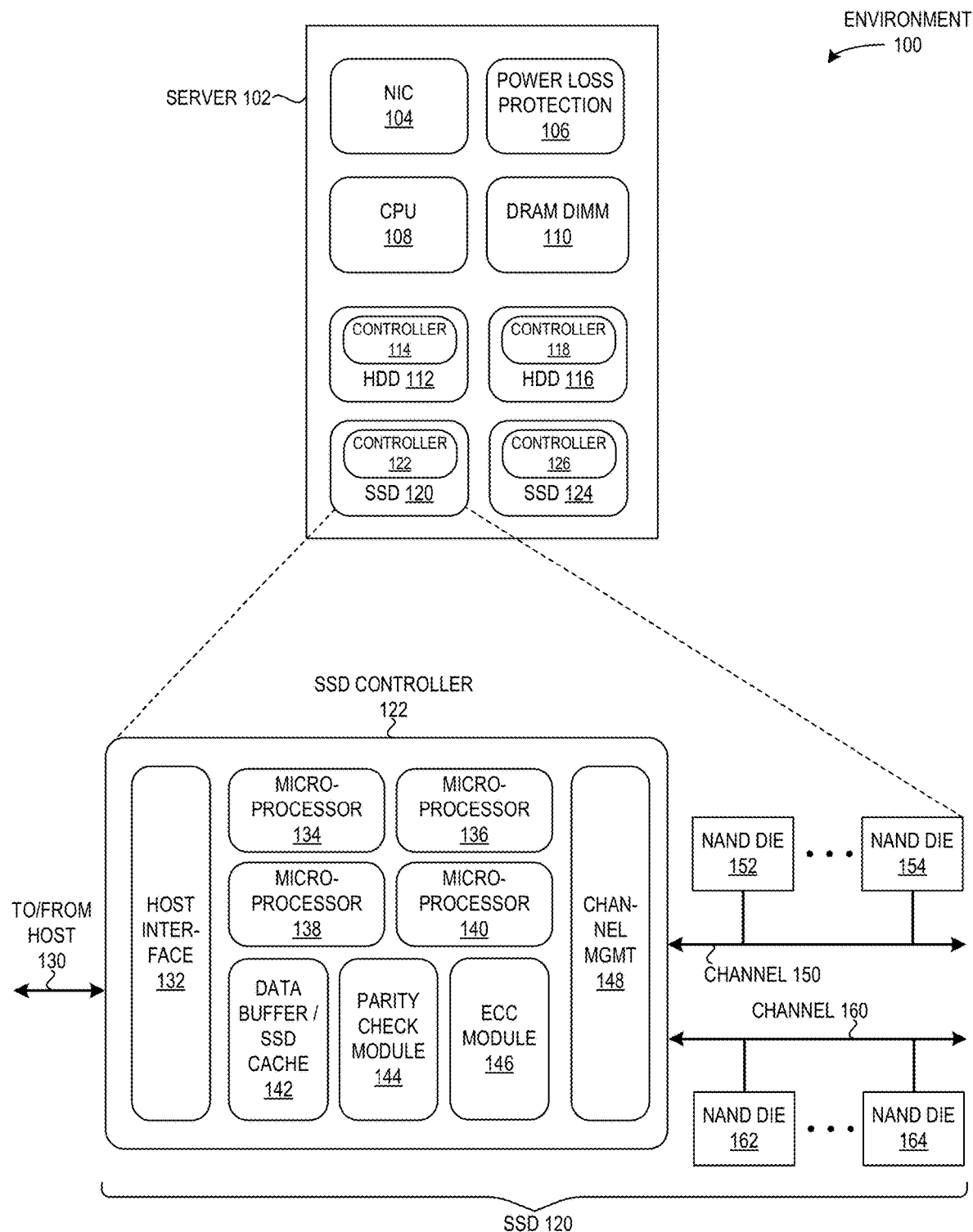
FIG. 1 illustrates an exemplary environment that facilitates atomicity assurance on data and metadata in a stream of data, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of providing atomicity assurance for storing a bundle of data and its corresponding metadata in a storage device.

In conventional storage systems in the past, data and corresponding metadata (e.g., from an incoming input/output (I/O) request) were written separately, resulting in two separate I/O write operations to store the data and another two separate I/O read operations to subsequently access the data. To reduce the number of I/O operations and to increase both the performance and efficiency of the overall storage system, data and its corresponding metadata can be "bundled" together to provide atomicity assurance. However, bundling the data and metadata together results in an increase in the overall size or length of the data to be written (in one transaction), and the increased length typically does not align with a standard block size. This may create issues with the specific type of physical media relied upon and to which the bundled data is to be written.

In a prior generation of NAND flash (e.g., 2D planar NAND flash), the system can accommodate metadata inserted into the same I/O request as the corresponding data by writing the data to a page region and by writing the corresponding metadata to an out of bound region for the page region. However, in the current generation of NAND flash (e.g., 3D TLC NAND), the out of bound region does not provide sufficient space in which to write the corresponding metadata, as described below in relation to FIG. 2. Thus, in the current generation of storage devices, the issue remains of how to bundle data and its corresponding metadata to provide atomicity assurance for writing the bundle to a storage device.

The embodiments described herein address this issue by providing a system which receives, from a host, a stream of data to be written to a storage device, where the data stream includes multiple I/O requests, which are each associated with data and corresponding metadata. The system executes a first I/O request (data_1+metadata_1) by writing data as a first logical sector (e.g., data_1) and by writing the corresponding metadata appended by zeros as a second logical sector (e.g., metadata_1+zeros). Each logical sector corresponds to a sequentially ordered physical sector (e.g., a physical page) of the storage device. When the system receives the next I/O request (data_2+metadata2), the system reads out the last logical sector and extracts the useful (i.e., non-zero) information, which is the "residual data" (in this case, metadata_1) by removing the appended zeros, and concatenates the residual data with a first portion of the incoming bundled data (e.g., the first portion of data_2) to form a third logical sector, which is written to the storage device. The system writes the remaining portion of the incoming data (e.g., the second portion of data_2+metadata_2+zeros) to form a fourth logical sector, which is also written to the storage device. An exemplary environment depicting these communications is described below in relation to FIG. 3.

However, this method can result in a high write amplification, as each operation consists of two steps: 1) appending zeros to the residual data or metadata to form a logical sector, and writing the logical sector to the storage device; and 2) reading out the previously written sector from the storage device, dropping the zeros, appending the data from the next I/O request to form a new logical sector, and writing this newly formed logical sector to the storage device. This high write amplification can result in a high level of wear-out of the physical storage device, and can also reduce the latency of each I/O request. These issues can decrease both the efficiency and performance of the storage device and the overall storage system.

The embodiments described herein further improve on the aforementioned method by using a transient caching and tail identification scheme. The transient caching involves: placing residual data in a data buffer or cache instead of performing the first operation above; appending the data from the next I/O request to form a physical sector in the data buffer; and writing the physical sector from the data buffer to the storage device. The tail identification involves identifying the tail of the stream, which causes the system to append zeros to the residual data (which identified is the tail or the end of the current I/O request) to form a physical sector in the data buffer, and to write the physical sector from the data buffer to the storage device. By using the transient caching and tail identification, the embodiments described herein can eliminate one write operation (as in the first step of the method which results in a high write amplification) as well as one read operation (as in the second step of the same method). An exemplary environment depicting the transient caching and tail identification is described below in relation to FIG. 4.

Thus, the embodiments described herein provide a system which improves and enhances the efficiency and performance of a storage system. By utilizing transient caching and tail identification, the system can provide atomicity assurance for bundled data which is written to a storage device. The described embodiments also result in reduced write amplification and a reduced number of I/O operations, which can mitigate the wear-out of physical media of a storage device and consequently increase the endurance of the physical media. These benefits result in an improved and more efficient storage system.

The term "atomicity" refers to a feature in which each transaction is an indivisible and irreducible series of operations, such that either everything in the transaction occurs, or nothing in the transaction occurs. The term "atomicity assurance" refers to ensuring that such a transaction is executed in a way which guarantees the atomicity or indivisibility of the transaction.

The term "metadata" refers to data which describes other data.

The term "bundle" or "bundled data" refers to data and its corresponding metadata in a specific I/O request. In this disclosure, a bundle of data is written to a storage device in a way which ensures atomicity assurance, as described below in relation to FIG. 4.

The terms "storage device" and "storage drive" refers to a device or a drive with physical media to which data can be written or stored, such as a solid state drive (SSD) which has Not-And (NAND) flash storage. The term "storage system" refers to a device or system which has one or more storage devices or drives.

Exemplary Environment and Network

FIG. 1 illustrates an exemplary environment 100 that facilitates atomicity assurance on data and metadata in a stream of data, in accordance with an embodiment of the present application. Environment 100 can include a server 102, which can be a storage device or a computing device with multiple storage drives. Each storage drive, such as a solid state drive (SSD) or a hard disk drive (HDD), can include a controller and multiple physical media for data storage. For example, an SSD can include NAND physical media for storage, and an HDD can include physical media with multiple tracks for storage. Server 102 can communicate via a network with a client computing device (not shown). Server 102 can also be a part of distributed storage system which can include multiple storage servers in communication with multiple client servers (not shown).

Server 102 can include: a network interface card (NIC) 104; a power loss protection module 106; a central processing unit (CPU) 108; a dynamic random access memory dual in-line memory module (DRAM DIMM) 110; hard disk drives (HDDs) 112 and 116 (with, respectively, controllers 114 and 118); and solid state drives (SSDs) 120 and 124 (with, respectively, controllers 122 and 126).

A controller can include interfaces to a host and to a non-volatile memory. For example, in SSD 120, SSD controller 122 can include: a host interface 132; multiple microprocessors 134, 136, 138, and 140; a data buffer/SSD cache 142; a parity check module 144; an error correction code (ECC) module 146; and a channel management (or media interface) 148. SSD controller 122 can communicate with a host (e.g., via host interface 132 and a communication to/from host 130). SSD controller 122 can also communicate with the non-volatile memory (via channel management 148). The non-volatile memory can be accessed via multiple channels. For example, NAND dies 152-154 may be accessed via a channel 150, and NAND dies 162-164 may be accessed via a channel 160.

During operation, in the embodiments described herein, SSD 120 can receive a first stream of data to be written to SSD 120 (e.g., to be stored in the non-volatile memory of the NAND media, including NAND dies 152-154 and 162-164). Microprocessors 134-140 can place data in logical sectors using the method described below in relation to FIGS. 3 and 4, which involves keeping together a "bundle" of data and corresponding metadata of a current I/O request (of a plurality of I/O requests of a stream of data). The system can keep each bundle together by successfully storing all data and its corresponding metadata together in an atomic transaction. The system can accomplish this by placing "residual data" (i.e., any remaining data from a current bundle which does not form a full physical sector) in data buffer/SSD cache 142 for a temporary period of time (i.e., transient caching). The system can append data from the next bundle to form a physical sector in the data buffer, and write the physical sector from the data buffer to the storage device. The system can also identify the tail or the end of the data stream, append zeros to the residual data to form a physical sector in the data buffer, and write the physical sector from the data buffer to the storage device. An exemplary environment depicting the transient caching and tail identification is described below in relation to FIGS. 4, 5A, and 5B.

By performing the transient caching and the tail identification, the embodiments of the system described herein can provide atomicity assurance in an efficient and improved manner, such that each transaction is an indivisible and irreducible series of operations in which either everything in the transaction occurs, or nothing in the transaction occurs. Furthermore, the claimed system improves the write amplification as well as reduces the number of read operations and write operations necessary to provide atomicity assurance in writing a stream of data to a storage device (e.g., to NAND dies 152-154 and 162-164 of SSD 120).

Atomicity Assurance in the Prior Art

Figure 2:
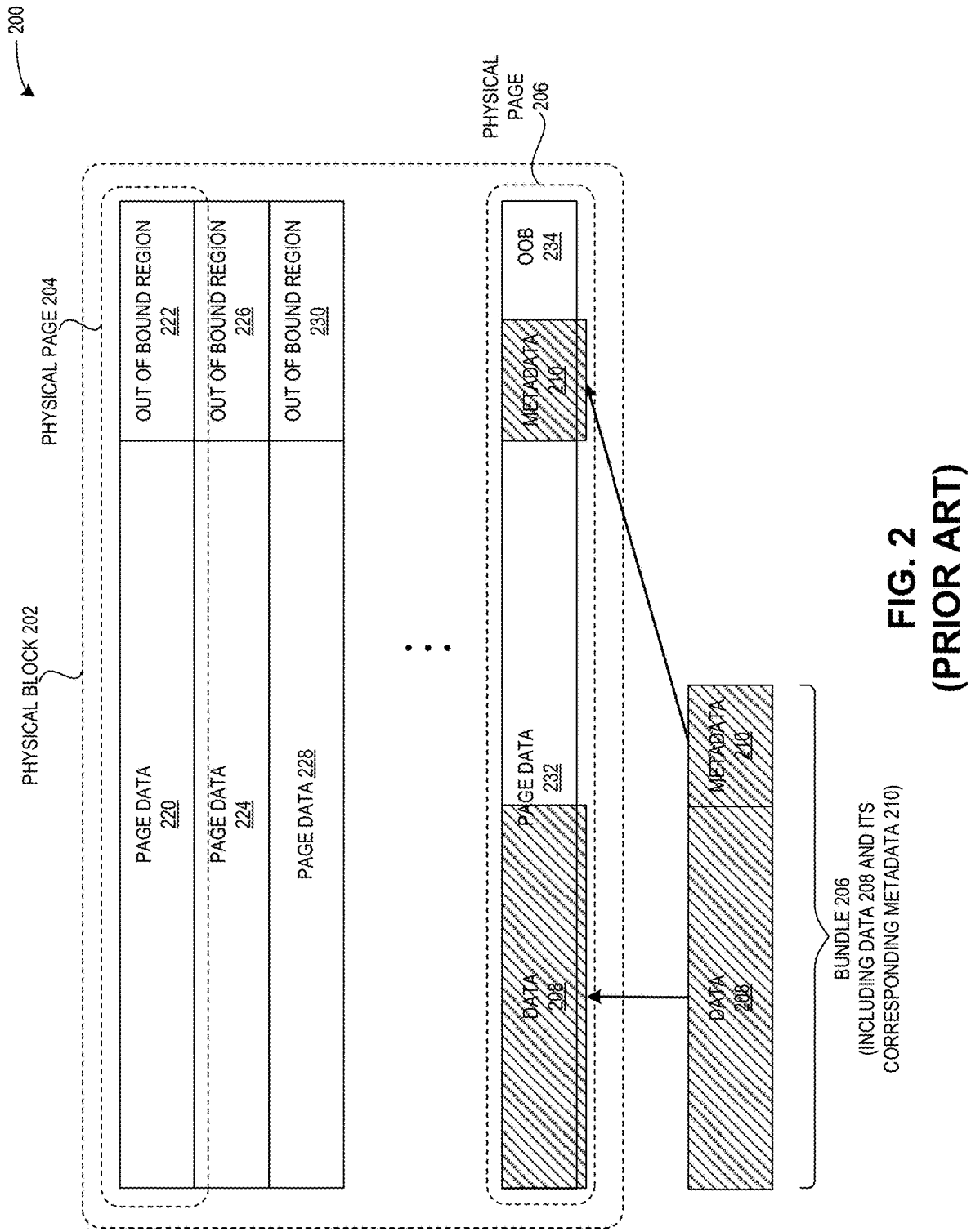
FIG. 2 illustrates an exemplary environment illustrating how metadata is stored in an out of bound region of a same physical page, in accordance with the prior art.

FIG. 2 illustrates an exemplary environment 200 illustrating how metadata is stored in an out of bound region of a same physical page, in accordance with the prior art. Environment 200 can depict a 2D planar NAND flash media, and can include a physical block 202 and multiple physical pages, such as a physical page 204 and a physical page 206. Each physical page can include a region to which to write data, and an out of bound (OOB) region to which to write, e.g., the parity bits for error correction coding (ECC). For example, physical page 206 can include a first region which include page data 232, and a second region which is an OOB region 234.

Data can be written in a "bundle" to a physical page, such as a bundle 206, which includes data 208 and its corresponding metadata 210. For example, data 208 can be written to page data 232 portion of physical page 206, while metadata 210 can be written to OOB 234 portion of physical page 206. This provides atomicity assurance, in that the data and the metadata in the data bundle is written together, rather than the data and the metadata being written separately and requiring two separate I/O operations, as discussed above.

In the prior technology of 2D planar NAND flash, the noise condition or "noisiness" can be tolerable, such that the ECC in the 2D planar NAND flash does not occupy the entirety of the OOB region, which leaves sufficient space in the OOB region in which to store metadata corresponding to data stored in the page data region of the same physical page.

However, current technology includes 3D TLC NAND, which typically has a higher capacity and a higher density than the 2D planar NAND flash. The 3D TLC NAND has a much higher noise condition or noisiness level, and can be corrected using a low-density-parity-code (LDPC) in order to meet production requirements. In this case, the OOB region of the 3D TLC NAND can provide the necessary ECC, but provides insufficient space in which to store any additional data (e.g., the metadata corresponding to data stored in the page data region).

Thus, in the current generation of storage devices, the issue remains of how to bundle data and its corresponding metadata to provide atomicity assurance for writing the bundle to a storage device.

Figure 3:
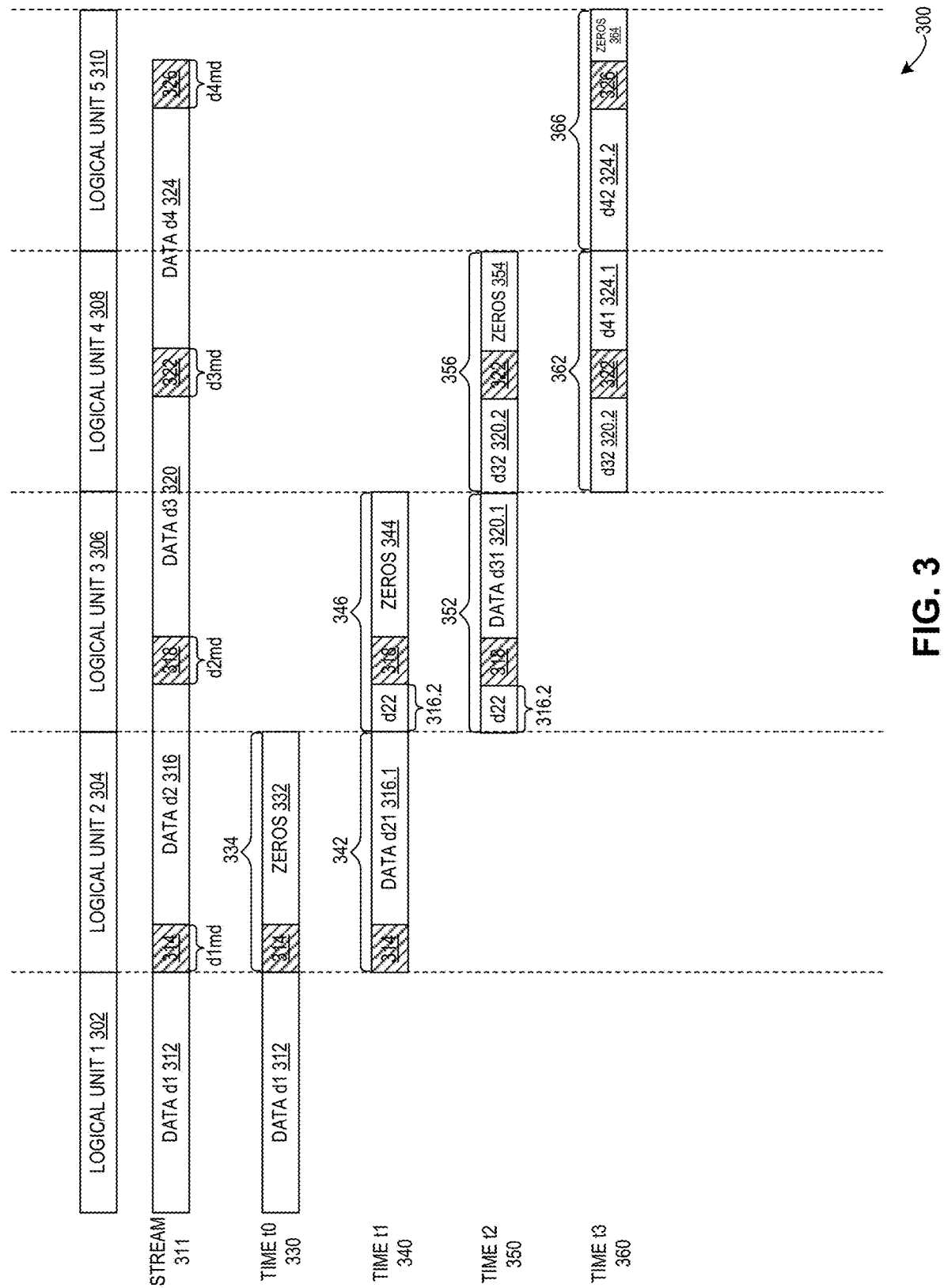
FIG. 3 illustrates an exemplary environment that facilitates atomicity assurance on data and metadata in a stream of data, in accordance with an embodiment of the present application.

Exemplary Environment for Facilitating Atomicity Assurance, and Related Challenges FIG. 3 illustrates an exemplary environment 300 that facilitates atomicity assurance on data and metadata in a stream of data, in accordance with an embodiment of the present application. Environment 300 can include logical units 1-5 (302-310). Metadata is indicated in boxes with diagonally left-slanting lines. During operation, the system can receive a stream of data to be written to a storage device, which can include a plurality of I/O requests, each with associated data and corresponding metadata. For example, a stream 311 can include: data d1 312 and corresponding metadata d1md 314; data d2 316 and corresponding metadata d2md 318; data d3 320 and corresponding metadata d3md 322; and data d4 324 and corresponding metadata d4md 326. At a time t0 330, the system can write a bundle of d1 312+d1md 314 (e.g., the data and corresponding metadata of the current I/O request) in one atomic transaction, by: writing d1 312 as a first logical sector (e.g., as aligned to a physical page size of the NAND flash storage of an SSD) to a first physical sector of the NAND; appending zeros to the remainder of the bundle to form a second logical sector; and writing the second logical sector (data 334, which includes d1md 314+zeros 332) to the NAND.

Subsequently, at a time t1 340, the system can write the next bundle (e.g., the data and corresponding metadata of the next I/O request) of the same data stream, by: reading out the previously written sector (data 334); dropping the zeros 332; appending the data from the next I/O request to form a third logical sector; and writing the third logical sector (data 342, which includes d1md 314+data d21 316.1) to the NAND. As part of the same transaction, and to provide atomicity assurance, the system also writes a remainder of the bundle of this next I/O request. That is, the system appends zeros 344 to data d22 316.2+d2md 318, to form a fourth logical sector, and writes the fourth logical sector (data 346, which includes data d22 316.2+d2md 318+zeros 344) to the NAND.

The system continues to write the data from data stream 311 in a similar fashion. That is, at a time t2 350, the system can write the next bundle (e.g., the data and corresponding metadata of the next I/O request) of the same data stream, by: reading out the previously written sector (data 346); dropping the zeros 344; appending the data from the next I/O request to form a third logical sector; and writing the third logical sector (data 352, which includes d22 316.2+d2md 318+data d31 320.1) to the NAND. As part of the same transaction, and to provide atomicity assurance, the system also writes a remainder of the bundle of this next I/O request, by: appending zeros 354 to data d32 320.2+d3md 322, to form a fourth logical sector, and writes the fourth logical sector (data 356, which includes data d32 320.2+d3md 322+zeros 354) to the NAND.

Subsequently, at a time t3 360, the system can write the next bundle (e.g., the data and corresponding metadata of the next I/O request) of the same data stream, by: reading out the previously written sector (data 356); dropping the zeros 354; appending the data from the next I/O request to form a third logical sector; and writing the third logical sector (data 362, which includes d32 320.2+d3md 322+data d41 324.1) to the NAND. As part of the same transaction, and to provide atomicity assurance, the system also writes a remainder of the bundle of this next I/O request, by: appending zeros 364 to data d42 324.2+d4md 326, to form a fourth logical sector, and writes the fourth logical sector (data 366, which includes data d42 324.2+d4md 326+zeros 364) to the NAND.

As depicted above, the operations involved in environment 300 can result in a high write amplification, as each operation consists of two steps: 1) appending zeros to the residual data or metadata to form a logical sector, and writing the logical sector to the storage device; and 2) reading out the previously written sector, dropping the zeros, appending the data from the next I/O request to form a logical sector, and writing this logical sector to the storage device.

For example, the following is an abbreviated description of the previously described operation, showing the number of pages read or written in each step:
  i. Write d1+d1md+zeros to NAND (2-page write)
  ii. Retrieve d1md+zeros from NAND (1-page read)
  iii. Write d1md+d21 and d22+d2md+zeros to NAND (2-page write)
  iv. Retrieve d22+d2md+zeros from NAND (1-page read)
  v. Write d22+d2md+d31 and d32+d3md+zeros to NAND (2-page write)
  vi. Retrieve d32+d3md+zeros from NAND (1-page read)
  vii. Write d32+d3md+d41 and d42+d4md+zeros to NAND (2-page write)

As shown in the above abbreviated description, a high write amplification occurs as a result of performing the necessary steps to keep the bundled data together (e.g., to provide atomicity assurance for the stream of data). The high write amplification can result in a high level of wear-out of the physical storage device, and can also increase the latency of each I/O request. These issues can decrease both the efficiency and performance of the storage device, and the overall storage system.

The embodiments described herein provide a system which reduces the write amplification, which results in a lower level of wear-out, and can thus increase both the efficiency and performance of the storage device, as described below in relation to FIG. 4.

Improved Exemplary Environment for Facilitating Atomicity Assurance

Figure 4:
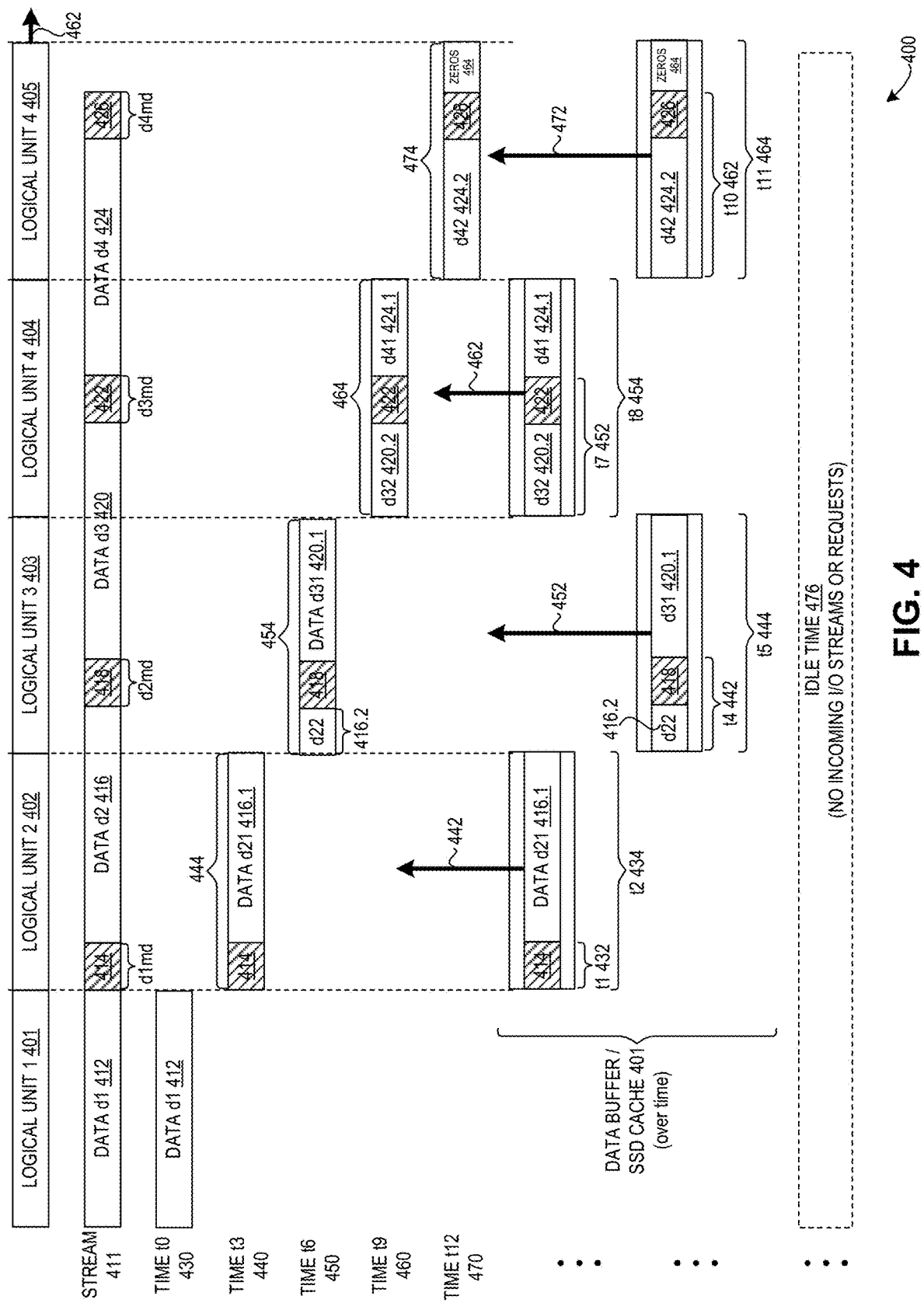
FIG. 4 illustrates an exemplary environment that facilitates atomicity assurance on data and metadata in a stream of data, including transient caching and tail identification, in accordance with an embodiment of the present application.

FIG. 4 illustrates an exemplary environment 400 that facilitates atomicity assurance on data and metadata in a stream of data, including transient caching and tail identification, in accordance with an embodiment of the present application. Environment 400 can include logical units 1-5 (401-405). Metadata is indicated in boxes with diagonally left-slanting lines. During operation, the system can receive a stream of data to be written to a storage device, which can include a plurality of I/O requests, each with associated data and corresponding metadata. For example, a stream 411 can include: data d1 412 and corresponding metadata d1md 414; data d2 416 and corresponding metadata d2md 418; data d3 420 and corresponding metadata d3md 422; and data d4 424 and corresponding metadata d4md 426.

At a time t0 430, in handling a current I/O request of data stream 411, the system can write a bundle of d1 412+d1md 414 (e.g., the data and corresponding metadata of the current I/O request) in one transaction, by: writing d1 412 as a first logical sector (e.g., as aligned to a physical page size of the NAND flash storage of an SSD) to a first physical sector of the NAND; and writing a remainder portion of the current I/O request to a temporary cache or a data buffer. For example, in the current I/O request, the remainder portion includes d1md 414, which is written to a data buffer/SSD cache 401 at a time t1 432, and is referred to as the "residual data." Thus, instead of appending zeros to the remainder portion and writing another page to the NAND, the system avoids a write operation. Furthermore, the system avoids a subsequent read operation by holding the residual data in a transient cache, e.g., for a temporary period of time in data buffer/SSD cache 401.

Subsequently, the system can handle the next I/O request and write the next bundle (e.g., data d2 416 and corresponding metadata d2md 418 of the next I/O request) of the same data stream, by writing a first portion of data (data d21 416.1) from the next I/O request (i.e., by appending the first portion of data to the residual data in data buffer 401 at a time t2 434) to obtain a first page of data (data 444). At a time t3 440, the system can write the full page of data 444 to the NAND (in a write operation 442). As part of handling this next I/O request, the system can write a remainder portion of this next I/O request to a temporary cache or a data buffer, which results in current residual data. For example, in this next I/O request, the remainder portion includes data d22 416.2 and d2md 418, which is written to data buffer 401 at a time t4 442, and is referred to as the current residual data. Thus, instead of appending zeros to the remainder portion and writing another page to the NAND, the system avoids a write operation, and also avoids a subsequent read operation by holding the residual data in the data buffer instead of writing it to the NAND only to be retrieved at a subsequent time, e.g., for the next I/O request.

Subsequently, the system can handle the next I/O request and write the next bundle (e.g., data d3 420 and corresponding metadata d3md 422 of the next I/O request) of the same data stream, by writing a first portion of data (data d31 420.1) from the next I/O request (i.e., by appending the first portion of data to the (current) residual data in data buffer 401 at a time t5 444) to obtain a first page of data (data 454). At a time t6 450, the system can write the full page of data 454 to the NAND (in a write operation 452). As part of handling this next I/O request, the system can write a remainder portion of this next I/O request to a temporary cache or a data buffer, which results in current residual data. For example, in this next I/O request, the remainder portion includes data d32 420.2 and d3md 422, which is written to data buffer 401 at a time t7 452, and is referred to as the current residual data. Thus, instead of appending zeros to the remainder portion and writing another page to the NAND, the system avoids a write operation, and also avoids a subsequent read operation by holding the residual data in the data buffer instead of writing it to the NAND only to be retrieved at a subsequent time, e.g., for the next I/O request.

Subsequently, the system can handle the next I/O request and write the next bundle (e.g., data d4 424 and corresponding metadata d4md 426 of the next I/O request) of the same data stream, by writing a first portion of data (data d41 424.1) from the next I/O request (i.e., by appending the first portion of data to the (current) residual data in data buffer 401 at a time t8 454) to obtain a first page of data (data 464). At a time t9 460, the system can write the full page of data 464 to the NAND (in a write operation 462). As part of handling this next I/O request, the system can write a remainder portion of this next I/O request to a temporary cache or a data buffer, which results in current residual data. For example, in this next I/O request, the remainder portion includes data d42 424.2 and d4md 426, which is written to data buffer 401 at a time t10 462, and is referred to as the current residual data. Thus, instead of appending zeros to the remainder portion and writing another page to the NAND, the system avoids a write operation, and also avoids a subsequent read operation by holding the residual data in the data buffer instead of writing it to the NAND only to be retrieved at a subsequent time, e.g., for the next I/O request.

Subsequently, the system can determine that the residual data corresponds to an end of the stream (i.e., can identify the tail of the stream). At a time t11 464, the system appends zeros 464 to the residual data, to obtain a full page of data (data 474), and, at a time t12 470, writes the full page of data 474 to the NAND (in a write operation 472). Because the system has identified the tail of the current stream, an idle time 476 may occur, which is a time during which no incoming I/O streams or requests are being processed or handled. Any subsequently received data streams can be handled in the same manner described above as for stream 411.

As depicted above, the operations involved in environment 400 can result in a reduced write amplification, because instead of appending zeros to the remainder portion and writing another page to the NAND, the system avoids a write operation, and further avoids a subsequent read operation by holding the residual data in the data buffer (instead of writing it to the NAND only to be retrieved at a subsequent time, such as for the next I/O request).

For example, the following is an abbreviated description of the previously described operation, showing the number of pages read or written in each step as well as an indicator of whether the residual data corresponds to a tail of the stream:

i. T0: Write d1 to NAND (1-page write)
  ii. T1: Write d1md to buffer <residual !=tail>
  iii. T2: Write d21 to buffer
  iv. T3: Write d1md+d21 to NAND (1-page write)
  v. T4: Write d22+d2md to buffer <residual !=tail>
  vi. T5: Write d31 to buffer
  vii. T6: Write d22+d2md+d31 to NAND (1-page write)
  viii. T7: Write d32+d3md to buffer <residual !=tail>
  ix. T8: Write d41 to buffer
  x. T9: Write d32+d3md+d41 to NAND (1-page write)
  xi. T10: Write d42+d4md to buffer <residual=tail>
  xii. T11: Append zeros to buffer
  xiii. T12: Write d42+d4md+zeros to NAND (1-page write)

As shown in the above abbreviated description, a reduced write amplification occurs as a result of utilizing the transient cache and the tail identification. Given a similar data stream (e.g., such as data streams 311 and 411, with the same amount of bundled data), the embodiments of the system eliminate one write operation and one read operation, while accomplishing the objective of atomicity assurance. This reduced write amplification can result in a lower level of wear-out of the physical storage device, and can also reduce the latency of each I/O request, which results in an increase in both the efficiency and performance of the storage device and the overall storage system.

Thus, environment 400 depicts how using a transient cache and tail identification in writing a data stream can provide atomicity assurance for the bundled data in the plurality of I/O requests of the data stream. The described method can thus result in an improved and more efficient storage system.

Exemplary Method for Facilitating Atomicity Assurance in a Storage Device

Figure 5A:
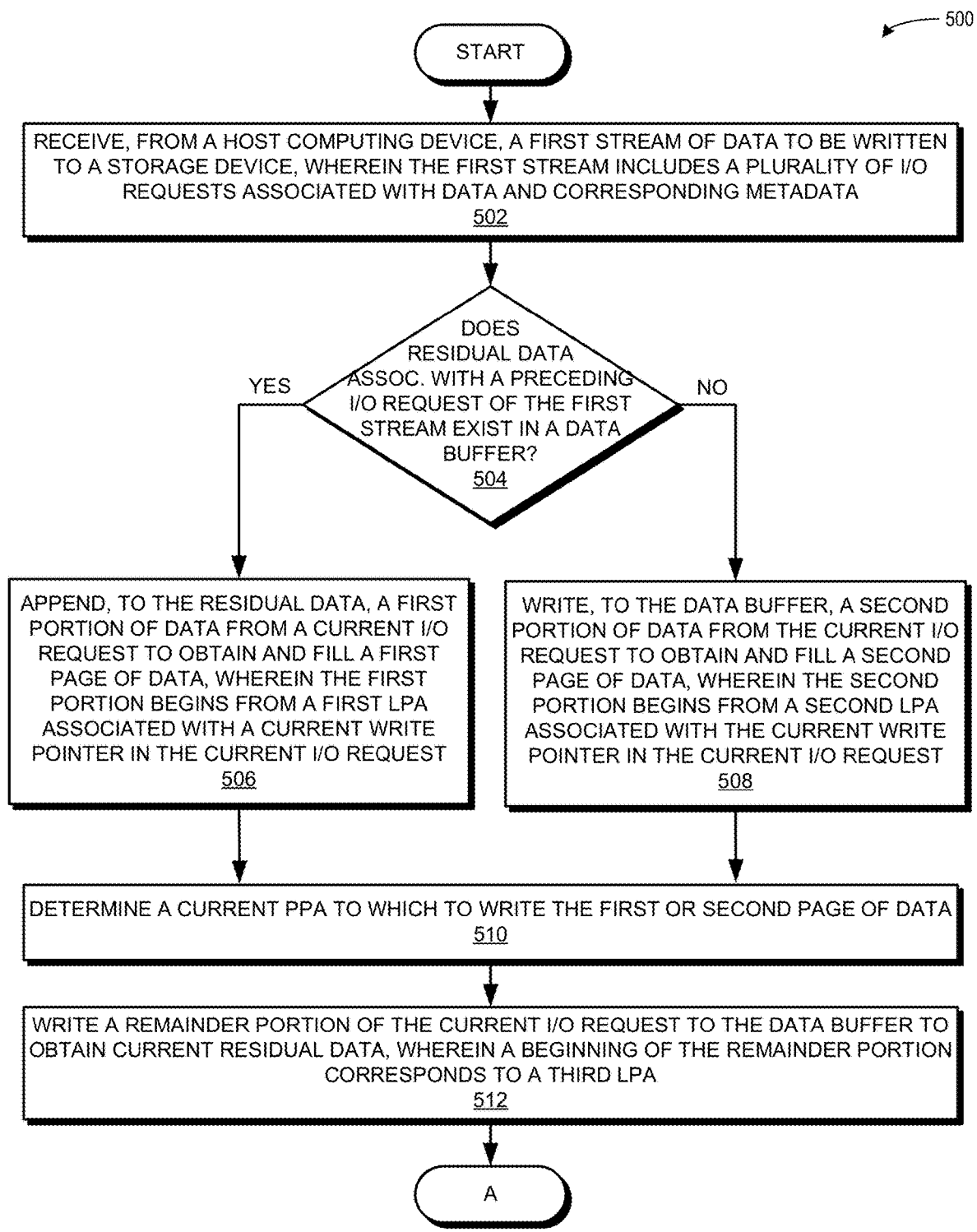
FIG. 5A presents a flowchart illustrating a method for facilitating atomicity assurance on data and metadata in a stream of data, in accordance with an embodiment of the present application.

FIG. 5A presents a flowchart illustrating a method 500 for facilitating atomicity assurance on data and metadata in a stream of data, in accordance with an embodiment of the present application. During operation, the system receives, from a host computing device, a first stream of data to be written to a storage device, wherein the first stream includes a plurality of I/O requests associated with data and corresponding metadata (operation 502). If residual data associated with a preceding I/O request of the first stream exists in a data buffer (decision 504), the system appends, to the residual data, a first portion of data from a current I/O request to obtain and fill a first page of data, wherein the first portion begins from a first LPA associated with a current write pointer in the current I/O request (operation 506). If residual data associated with a preceding I/O request of the first stream does not exist in a data buffer (decision 504), the system writes, to the data buffer, a second portion of data from the current I/O request to obtain and fill a second page of data, wherein the second portion begins from a second LPA associated with the current write pointer in the current I/O request (operation 508).

The system determines a current PPA to which to write the first or second page of data (operation 510). The system writes a remainder portion of the current I/O request to the data buffer to obtain current residual data, wherein a beginning of the remainder portion corresponds to a third LPA (operation 512). The operation continues as described at Label A of FIG. 5B.

Figure 5B:
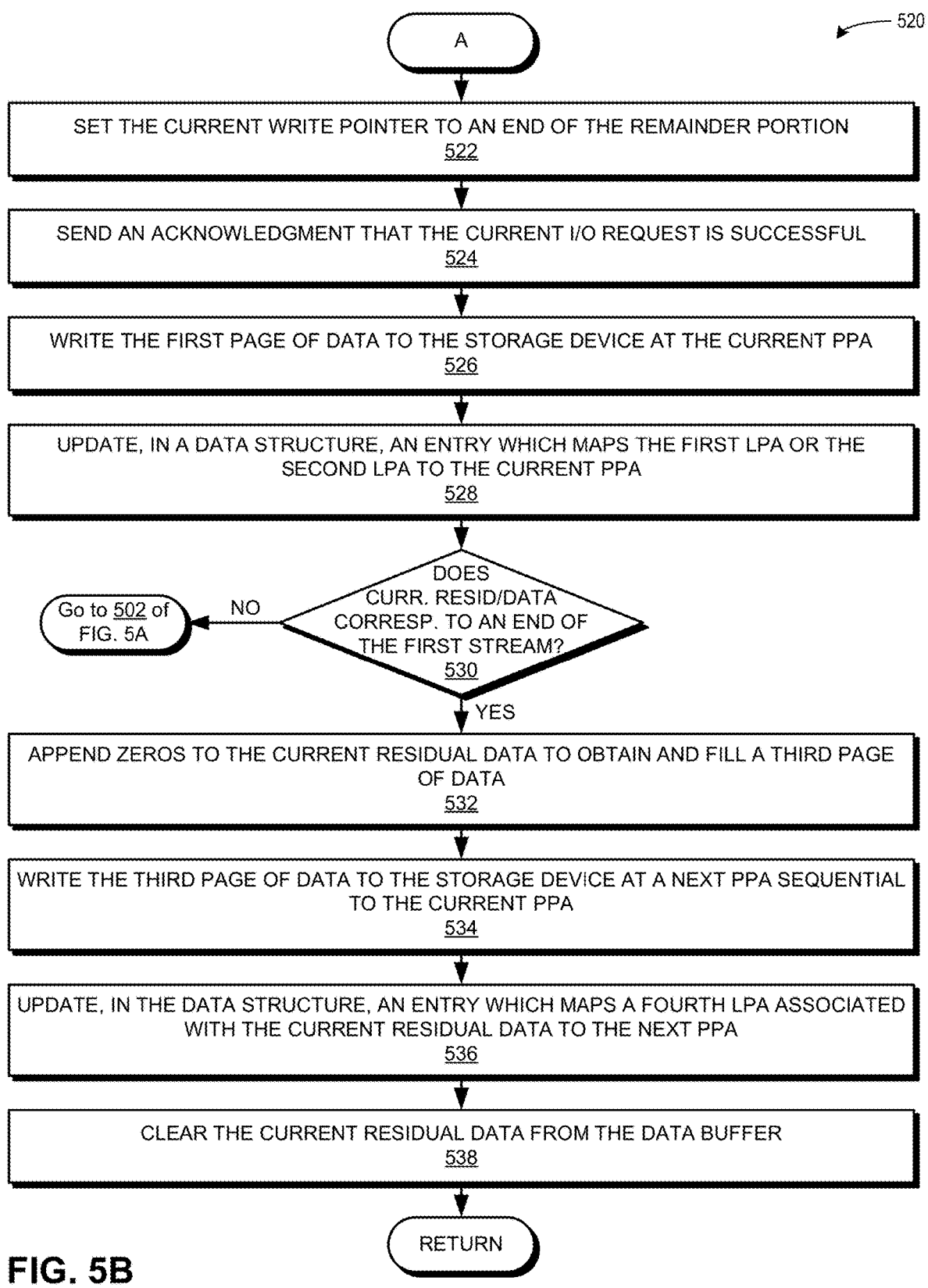
FIG. 5B presents a flowchart illustrating a method for facilitating atomicity assurance on data and metadata in a stream of data, in accordance with an embodiment of the present application.

FIG. 5B presents a flowchart illustrating a method 520 for facilitating atomicity assurance on data and metadata in a stream of data, in accordance with an embodiment of the present application. During operation, the system sets the current write pointer to an end of the remainder portion (operation 522). The system sends an acknowledgment (to the host) that the current I/O request is successful (operation 524). Note that as long as data (i.e., as residual data) is written to the data buffer or cache of the SSD, the system can send the acknowledgment to the host of a successful write. That is, due in part to the power loss protection provided by the SSD (as described below in relation to FIG. 6A), the data need not first be written to the physical media itself before sending the write acknowledgment to the host.

The system writes the first page of data to the storage device at the current PPA (operation 526). The system updates, in a data structure, an entry which maps the first LPA or the second LPA to the current PPA (operation 528). The system can also update, in the data structure, an entry which maps the third LPA to a next PPA sequential to the current PPA.

If the current residual data does not correspond to an end of the first stream (decision 530), the operation continues as described at operation 502 of FIG. 5A. If the current residual data does correspond to an end of the first stream (decision 530), the system appends zeros to the current residual data to obtain and fill a third page of data (operation 532). The system writes the third page of data to the storage device at a next PPA sequential to the current PPA (operation 534). The system updates, in the data structure, an entry which maps a fourth LPA associated with the current residual data to the next PPA (operation 536). The system clears the current residual data from the data buffer (operation 538), and the operation returns.

Exemplary Solid State Drive with Multiple Microprocessors; Exemplary Method for Communicating Tail Identification Between Microprocessors One practical issue in implementing the above-described method (of FIGS. 4, 5A, and 5B) is related to the hardware architecture of an SSD. Given multiple microprocessors in a single SSD controller, any microprocessor can handle any of the logical sectors in a data stream, where each logical sector can be assigned to a certain NAND die. Ideally, during the handling and writing of a respective logical sector, a first microprocessor can determine whether the logical sector includes the tail of the stream by checking whether a second microprocessor responsible for the next LBA is busy or not. However, there is no direct communication between the microprocessors, which makes it difficult to identify (and coordinate identification of) the tail of the stream.

FIG. 6A presents an exemplary architecture of a solid state drive 600, in accordance with an embodiment of the present application. SSD 600 can include an SSD controller 601, which can include: a host interface 602; an incoming data buffer/SSD cache 604; multiple microprocessors (such as 606, 608, 610, and 612); a parity check module 614; an error correction coding (ECC) module 616; and a media interface 618, through which data can be accessed to/from NAND 620, 622, 624, and 626. SSD 600 can also include a power loss protection module 630 and DRAM 632.

As described above, microprocessors 606-612 have no means to directly communicate with each other regarding the tail identification. To solve this problem, in the embodiments described here, the system can use the LPA to PPA mapping table. FIG. 6B presents an exemplary environment 640 in which multiple microprocessors use an LPA to PPA mapping table (or data structure) to communicate regarding tail identification, in accordance with an embodiment of the present application. Environment 640 can include an LPA to PPA mapping table 641, which can include entries with an LPA 642 field and a corresponding PPA 644 field. For example, an entry 666 can include an LPA 1 650 and a corresponding PPA 1 651, and an entry 668 can include an LPA 2 652 and a corresponding PPA 2 653. A core 1 680 can correspond to microprocessor 606 of FIG. 6A; a core 2 683 can correspond to microprocessor 608 of FIG. 6A; a core 3 686 can correspond to microprocessor 610 of FIG. 6A; and a core 4 689 can correspond to microprocessor 612 of FIG. 6A.

When a first microprocessor receives a write command for a respective logical sector, the first microprocessor searches for and retrieves, from the data structure, the current PPA to which to write the respective logical sector (e.g., a lookup 681 to obtain PPA 1 651). The first microprocessor then writes the respective logical sector to the current PPA. The first microprocessor also retrieves, from the data structure, a second PPA corresponding to a next LPA associated with the incoming I/O request (e.g., a lookup 682 to obtain PPA 2 653, an "initially retrieved second PPA"). The first microprocessor waits a predetermined amount or period of time, and retrieves this second PPA again ("subsequently retrieved second PPA"). The system compares the initially retrieved second PPA with the subsequently retrieved second PPA, and determines whether the entry has been updated. If the entry has been updated, the buffered residual data does not correspond to the tail of the stream. If the entry has not been updated (e.g., for a while, or during the predetermined amount or period of time), the buffered residual data does correspond to the tail of the stream, and the system performs operations 532-538 of FIG. 5B (e.g., appends zeros to the residual data to obtain a third page of data, writes the third page of data to the NAND, and clears the current residual data from the data buffer).

In some instances, the second PPA (whether the initially retrieved second PPA or the subsequently retrieved second PPA) can be null. When the physical address has been trimmed, the value of the entry can be bull. If the trim operation occurs between the initial retrieval of the second PPA and the subsequent retrieval of the second PPA, it can be difficult to determine whether the residual has been properly handled. The embodiments described herein solve this problem by writing a specific invalid (but not null) physical address to overwrite the null entry. After waiting the predetermined amount of time, the system reads the entry again (to obtain the subsequently retrieved second PPA). If the subsequently retrieved second PPA has been updated with a valid physical address, the system can determine that the residual was written. If the subsequently retrieved second PPA has not been updated (and is still the same as the specific invalid physical address), the system can determine that the residual data corresponds to the tail of the stream. If the subsequently retrieved second PPA is null, the system can determine that the second PPA has been trimmed and that the residual data has been written.

Figure 7A:
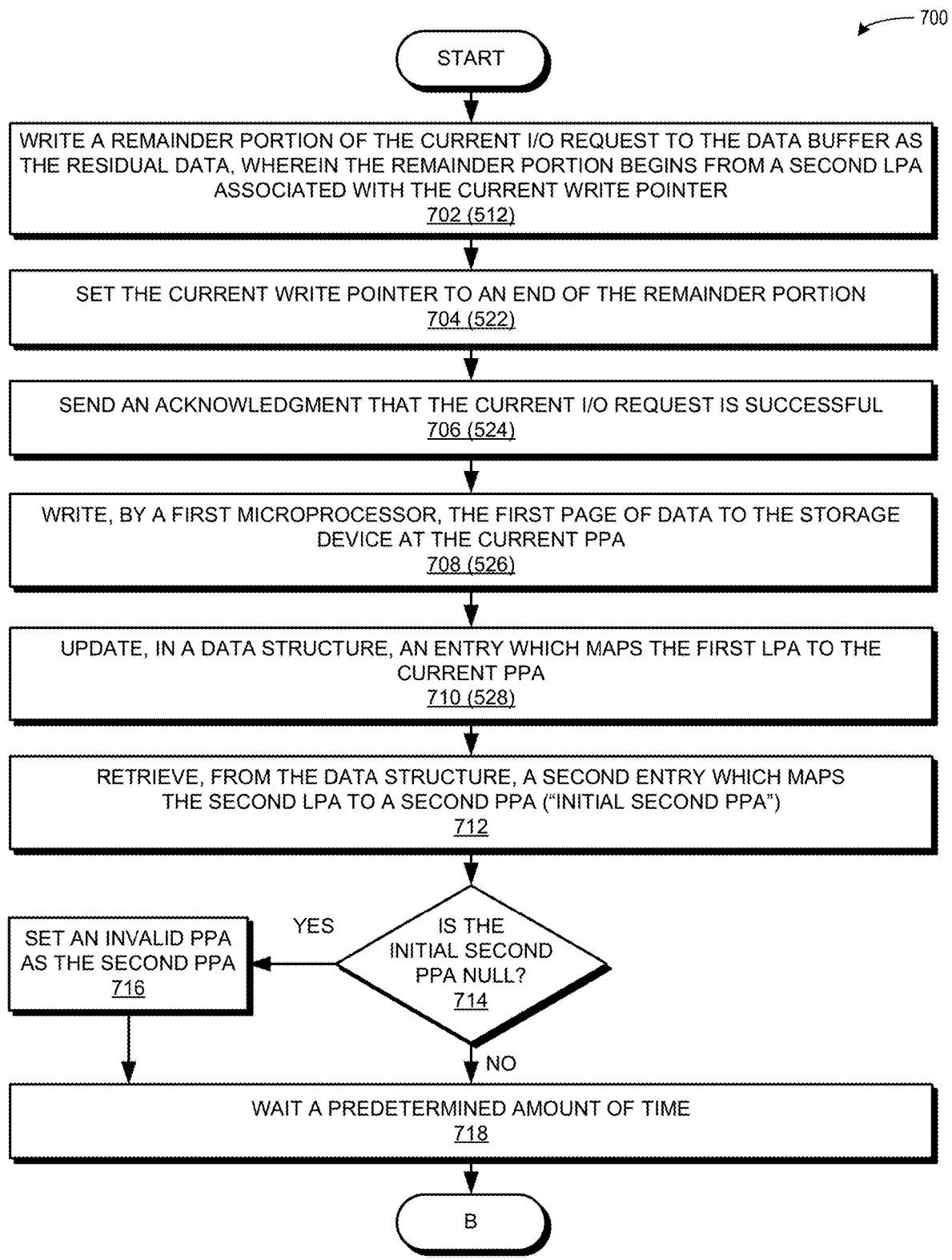
FIG. 7A presents a flowchart illustrating a method for determining and communicating tail identification, in accordance with an embodiment of the present application.

Exemplary Method for Determining and Communication Tail Identification Between Multiple Microprocessors FIG. 7A presents a flowchart 700 illustrating a method for determining and communicating tail identification, in accordance with an embodiment of the present application. During operation, the system writes a remainder portion of the current I/O request to the data buffer to obtain current residual data, wherein a beginning of the remainder portion corresponds to a third LPA (operation 702, similar to operation 512). The system sets the current write pointer to an end of the remainder portion (operation 704, operation 522). The system sends an acknowledgment (to the host) that the current I/O request is successful (operation 706, operation 524). The system writes the first page of data to the storage device at the current PPA (operation 708, similar to operation 526). The system updates, in a data structure, an entry which maps the first LPA or the second LPA to the current PPA (operation 710, similar to operation 528).

The system retrieves, from the data structure, an entry which maps the second LPA to a second PPA ("initial second PPA") (operation 712). If the second PPA is not null (decision 714), the system waits a predetermined amount of time (operation 718). If the second PPA is null (decision 714), the system sets an invalid PPA as the second PPA (operation 716), and waits a predetermined period of time (operation 718). The operation continues as described at Label B of FIG. 7B.

Figure 7B:
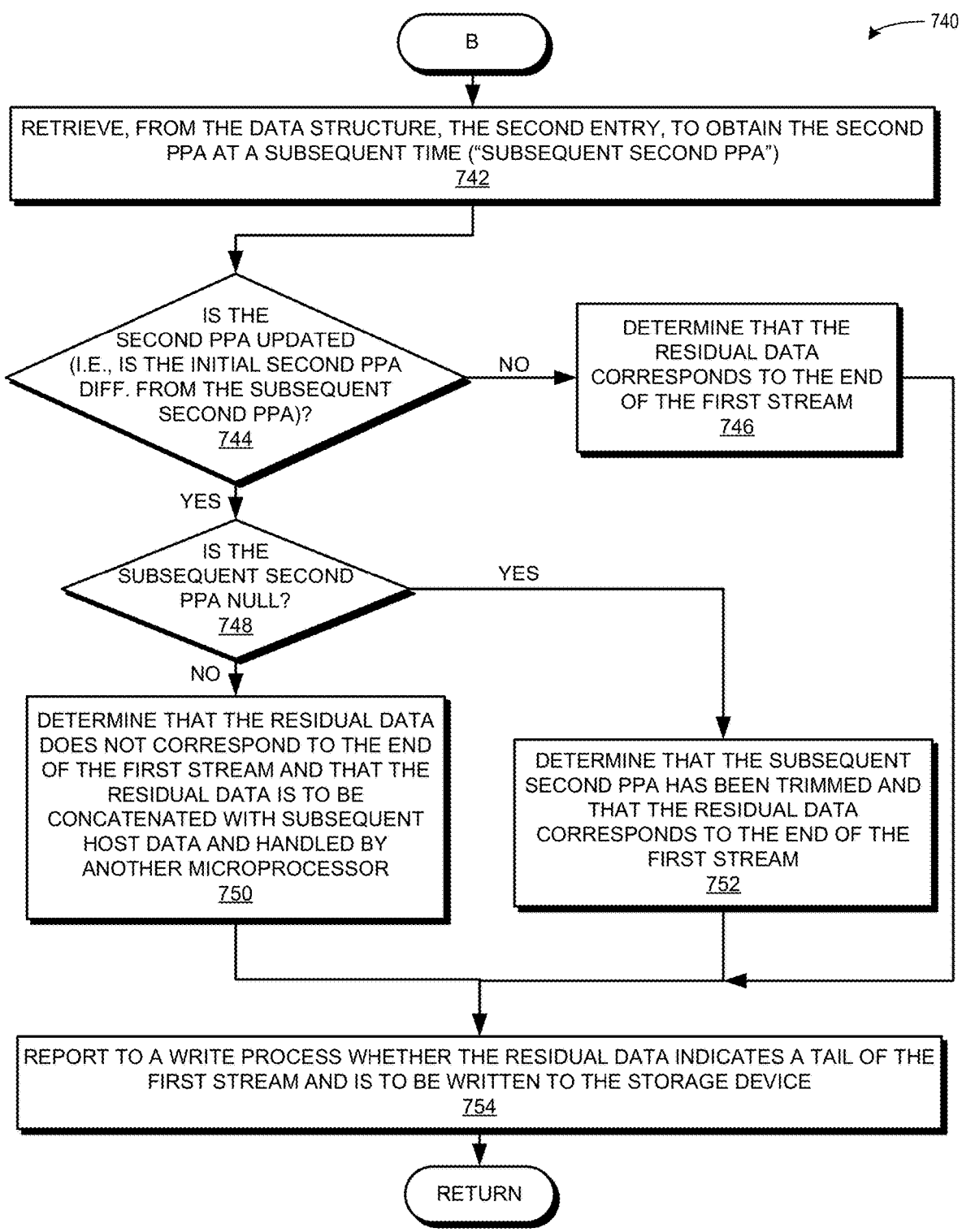
FIG. 7B presents a flowchart illustrating a method for determining and communicating tail identification, in accordance with an embodiment of the present application.

FIG. 7B presents a flowchart 740 illustrating a method for determining and communicating tail identification, in accordance with an embodiment of the present application. During operation, the system retrieves, from the data structure, the second entry, to obtain the second PPA at a subsequent time ("subsequent second PPA") (operation 742). If the second PPA is not updated (i.e., if the initial second PPA is not different from the subsequent second PPA) (decision 744), the system determines that the residual data corresponds to the end of the first stream (operation 746), and the system reports to a write process whether the residual data indicates a tail of the first stream and is to be written to the storage device (operation 754). In this instance, after operation 746, the system reports to the write process that the residual data does indicate the tail of the first stream.

If the second PPA is updated (i.e., if the initial second PPA is different from the subsequent second PPA) (decision 744), and if the subsequent second PPA is null (decision 748), the system determines that the subsequent second PPA has been trimmed and that the residual data corresponds to the end of the first stream (operation 752). The system reports to a write process whether the residual data indicates a tail of the first stream and is to be written to the storage device (operation 754). In this instance, after operation 752, the system reports to the write process that the residual data does indicate the tail of the first stream.

If the second PPA is updated (i.e., if the initial second PPA is different from the subsequent second PPA) (decision 744), and if the subsequent second PPA is not null (decision 748), the system determines that the residual data does not correspond to the end of the first stream and that the residual data is to be concatenated with subsequent host data and handled by another microprocessor (operation 750). The system reports to a write process whether the residual data indicates a tail of the first stream and is to be written to the storage device (operation 754). In this instance, after operation 750, the system reports to the write process that the residual data does not indicate the tail of the first stream.

Thus, even though the multiple microprocessors of the SSD cannot directly communicate with each other to determine the status of the residual data (i.e., whether the residual data corresponds to the tail of the stream), the system allows the multiple microprocessors to use the logical to physical mapping table (e.g., a data structure with entries which map an LPA to a corresponding PPA) to communicate regarding identification of the tail of the data stream. This can result in eliminating the need to write (twice) and read many logical sectors, which in turn can reduce the burden of the SSD, thereby improving the performance and extending the endurance of the physical media.

Exemplary Computer System

Figure 8:
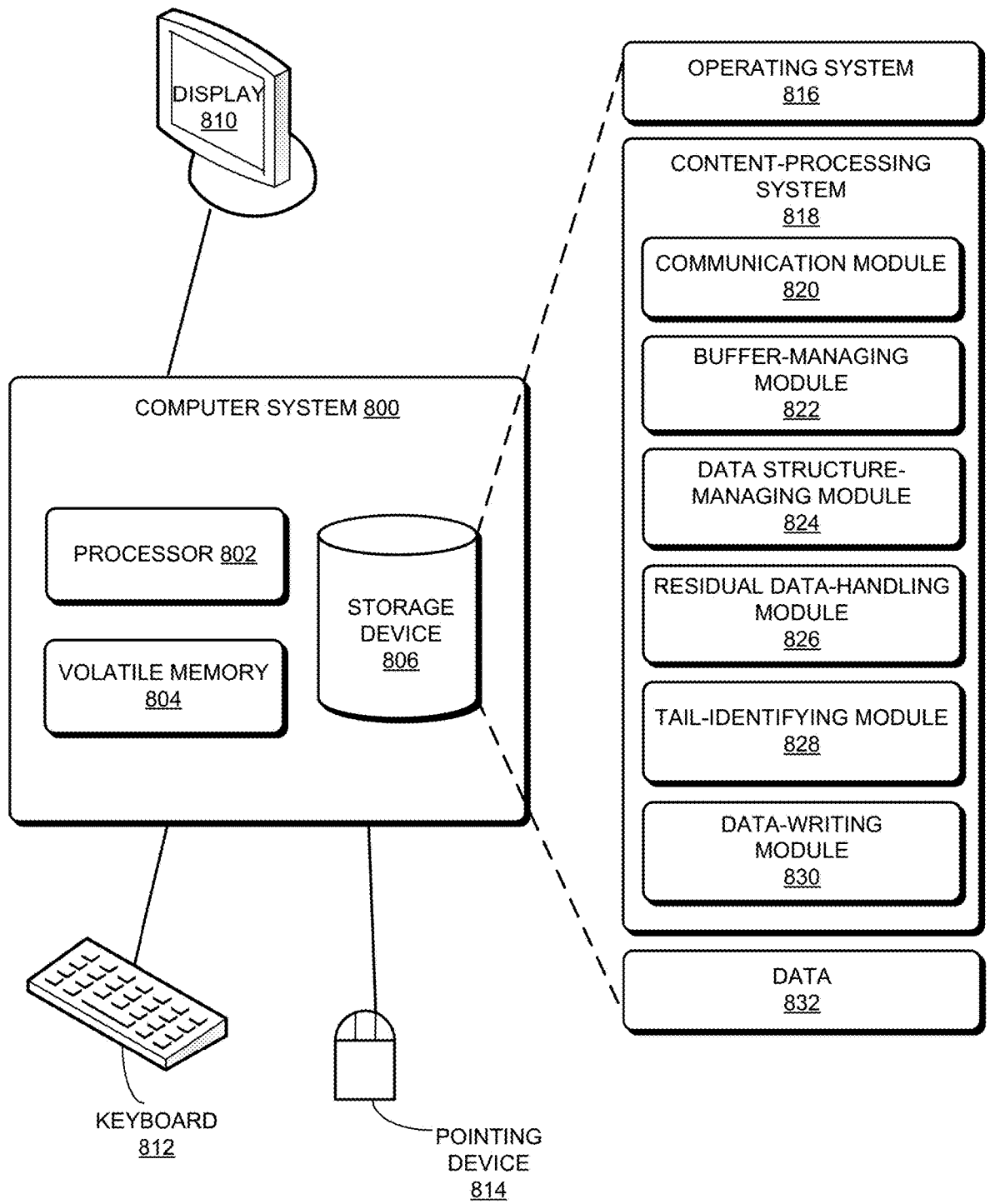
FIG. 8 illustrates an exemplary computer system that facilitates atomicity assurance on data and metadata in a stream of data, in accordance with an embodiment of the present application.

FIG. 8 illustrates an exemplary computer system that facilitates atomicity assurance on data and metadata in a stream of data, in accordance with an embodiment of the present application. Computer system 800 includes a processor 802, a volatile memory 804, and a storage device 806. Computer system 800 may be a computing device or a storage device. Volatile memory 804 can include memory (e.g., RAM) that serves as a managed memory, and can be used to store one or more memory pools. Computer system 800 can be coupled to a display device 810, a keyboard 812, and a pointing device 814. Storage device 806 can store an operating system 816, a content-processing system 818, and data 832.

Content-processing system 818 can include instructions, which when executed by computer system 800, can cause computer system 800 to perform methods and/or processes described in this disclosure. For example, content-processing system 818 can include instructions for receiving and transmitting data packets, including a request to read or write data, an I/O request, data to be retrieved, encoded, aligned, and stored, or a block or a page of data.

Content-processing system 818 can further include instructions for receiving a first stream of data to be written to a storage device, wherein the first stream includes a plurality of I/O requests associated with data and corresponding metadata (communication module 820). Content-processing system 818 can include instructions for, in response to determining that residual data associated with a preceding I/O request of the first stream exists in a data buffer (buffer-managing module 822): appending, to the residual data, a first portion of data from a current I/O request to obtain a first page of data (residual data-handling module 826); writing a remainder portion of the current I/O request to the data buffer to obtain current residual data (buffer-managing module 822); and writing the first page of data to the storage device at a current physical page address (data-writing module 830).

Content-processing system 818 can include instructions for, in response to determining that residual data associated with the first stream does not exist in the data buffer (buffer-managing module 822): writing, to the data buffer, a second portion of data from the current I/O request to obtain a second page of data, wherein the second portion begins from a second logical page address associated with a current write pointer in the current I/O request (buffer-managing module 822); writing the remainder portion of the current I/O request to the data buffer to obtain current residual data (residual data-handling module 826); setting the current write pointer to an end of the remainder portion (data-writing module 830); and updating, in a data structure, an entry which maps the second logical page address to the current physical page address (data structure-managing module 824).

Content-processing system 818 can also include instructions for, in response to determining that the current residual data corresponds to an end of the first stream (tail-identifying module 828): appending zeros to the current residual data to obtain a third page of data (residual data-handling module 826); writing the third page of data to the storage device at a next physical page address sequential to the current physical page address (data-writing module 830); updating, in a data structure, an entry which maps a fourth logical page address associated with the current residual data to the next physical page address (data structure-managing module 824); and clearing the current residual data in the data buffer (buffer-managing module 822).

Content-processing system 818 can include instructions for updating, in the data structure, an entry which maps a logical page address to a physical page address (data structure-managing module 824), e.g., as described above in relation to FIGS. 5A, 5B, 7A, and 7B.

Data 832 can include any data that is required as input or that is generated as output by the methods and/or processes described in this disclosure. Specifically, data 832 can store at least: data to be stored, written, loaded, moved, retrieved, accessed, deleted, encoded, recycled, refreshed, or copied; metadata; a stream of data; a logical sector or logical page of data; a physical sector or physical page of data; an I/O request; an I/O request with associated data and metadata; a bundle of data; bundled data which includes data and corresponding metadata; a data stream which includes a plurality of I/O requests; residual data in a data buffer; a data buffer; a page of data; a portion of data; a current write pointer; current residual data; a logical page address (LPA); a physical page address (PPA); a data structure or a table which maps LPAs to corresponding PPAs; an entry in the data structure or table; an indicator of whether residual data in a data buffer corresponds to an end of a data stream; appended zeros; an acknowledgment that an I/O request is successful, including that a write request has been successfully completed; an indicator of one of a plurality of microprocessors of a storage device; an initially retrieved second PPA; a subsequently retrieved second PPA; a predetermined amount or period of time; a PPA with a null value; an invalid PPA; an indicator of whether a PPA has been updated; a determination or report of whether residual data corresponds to the end of a stream; parity information; an error correction code (ECC); an ECC codeword of data; a NAND data buffer; an indicator of a specific NAND media; encoded data; aligned data; a data portion; and a parity portion.

Figure 9:
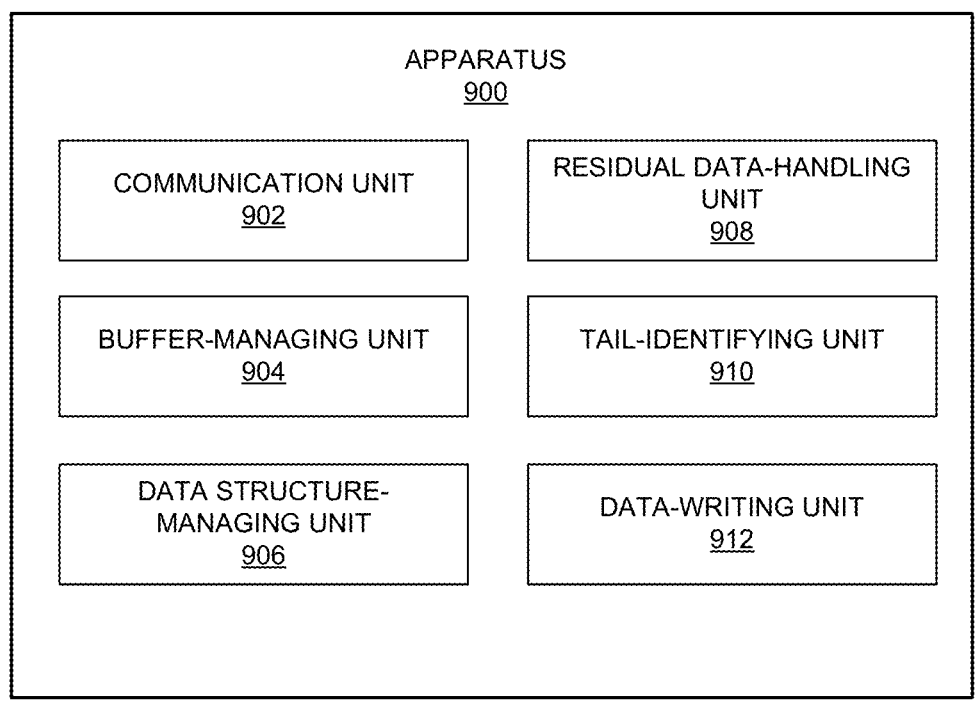
FIG. 9 illustrates an exemplary apparatus that facilitates atomicity assurance on data and metadata in a stream of data, in accordance with an embodiment of the present application.

FIG. 9 illustrates an exemplary apparatus 900 that facilitates atomicity assurance on data and metadata in a stream of data, in accordance with an embodiment of the present application. Apparatus 900 can comprise a plurality of units or apparatuses which may communicate with one another via a wired, wireless, quantum light, or electrical communication channel. Apparatus 900 may be realized using one or more integrated circuits, and may include fewer or more units or apparatuses than those shown in FIG. 9. Further, apparatus 900 may be integrated in a computer system, or realized as a separate device which is capable of communicating with other computer systems and/or devices. Specifically, apparatus 900 can comprise units 902-912 which perform functions or operations similar to modules 820-830 of computer system 800 of FIG. 8, including: a communication unit 902; a buffer-managing unit 904; a data structure-managing unit 906; a residual data-handling unit 908; a tail-identifying unit 910; and a data-writing unit 912.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for storing data and metadata in a data stream, the method comprising:
  receiving a first stream of data to be written to a storage device, wherein the first stream includes a plurality of I/O requests associated with data and corresponding metadata;
  in response to determining that residual data associated with a preceding I/O request of the first stream exists in a data buffer:
    appending, to the residual data, a first portion of data from a current I/O request to obtain a first page of data;
    writing a remainder portion of the current I/O request to the data buffer to obtain current residual data; and
    writing the first page of data to the storage device at a current physical page address, wherein the current physical page address is retrieved from a data structure based on a logical page address associated with the first page; and
  determining whether the current residual data corresponds to an end of the first stream, which comprises:
    retrieving, from the data structure, a second physical page address corresponding to a next logical page address associated with a next I/O request;
    responsive to determining that the second physical page address is null, setting the second physical page address to an invalid and not null physical page address;
    responsive to waiting a predetermined period of time, retrieving the second physical page address from the data structure; and
    responsive to determining that the second physical page address has been updated and is null, determining that the second physical page address has been trimmed and that the current residual data corresponds to the end of the first stream.

2. The method of claim 1, wherein the first portion begins from a first logical page address associated with a current write pointer in the current I/O request, and wherein the method further comprises:
  setting the current write pointer to an end of the remainder portion; and
  updating, in a data structure, an entry which maps the first logical page address to the current physical page address.

3. The method of claim 1, wherein in response to determining that residual data associated with the first stream does not exist in the data buffer, the method further comprises:
  writing, to the data buffer, a second portion of data from the current I/O request to obtain a second page of data, wherein the second portion begins from a second logical page address associated with a current write pointer in the current I/O request;
  writing the remainder portion of the current I/O request to the data buffer to obtain current residual data;
  setting the current write pointer to an end of the remainder portion; and
  updating, in a data structure, an entry which maps the second logical page address to the current physical page address.

4. The method of claim 1, wherein subsequent to writing the remainder portion of the current I/O request to the data buffer, the method further comprises:
  sending, to a host computing device from which the first stream of data is received, an acknowledgement that the current I/O request is successful.

5. The method of claim 1, wherein a beginning of the remainder portion in the current I/O request corresponds to a third logical page address, and wherein the method further comprises:
  updating, in a data structure, an entry which maps the third logical page address to a next physical page address sequential to the current physical page address.

6. The method of claim 1, wherein in response to determining that the current residual data corresponds to the end of the first stream, the method further comprises:
  appending zeros to the current residual data to obtain a third page of data;
  writing the third page of data to the storage device at a next physical page address sequential to the current physical page address;
  updating, in the data structure, an entry which maps a fourth logical page address associated with the current residual data to the next physical page address; and
  clearing the current residual data in the data buffer.

7. The method of claim 1, wherein determining whether the current residual data corresponds to the end of the first stream further comprises:
  receiving, by a first microprocessor of the storage device, a command to write the first page of data to the storage device, wherein the first microprocessor retrieves the current physical page address from the data structure;
  executing the command by writing the first page to the storage device at the current physical page address;
  responsive to determining that the second physical page address has been updated and is not null, determining that the current residual data does not correspond to the end of the first stream; and
  responsive to determining that the second physical page address has not been updated, determining that the current residual data corresponds to the end of the first stream.

8. The method of claim 7, further comprising:
  reporting whether the residual data corresponds to the end of the first stream.

9. A computer system for storing data and metadata in a data stream, the system comprising:
  a processor; and
  a memory coupled to the processor and storing instructions, which when executed by the processor cause the processor to perform a method, wherein the computer system comprises a storage device, the method comprising:

receiving a first stream of data to be written to the storage device, wherein the first stream includes a plurality of I/O requests associated with data and corresponding metadata;

in response to determining that residual data associated with a preceding I/O request of the first stream exists in a data buffer:
   appending, to the residual data, a first portion of data from a current I/O request to obtain a first page of data;
   writing a remainder portion of the current I/O request to the data buffer to obtain current residual data; and
   writing the first page of data to the storage device at a current physical page address, wherein the current physical page address is retrieved from a data structure based on a logical page address associated with the first page; and determining whether the current residual data corresponds to an end of the first stream, which comprises:
   retrieving, from the data structure, a second physical page address corresponding to a next logical page address associated with a next I/O request;
   responsive to determining that the second physical page address is null, setting the second physical page address to an invalid and not null physical page address;
   responsive to waiting a predetermined period of time, retrieving the second physical page address from the data structure; and
   responsive to determining that the second physical page address has been updated and is null, determining that the second physical page address has been trimmed and that the current residual data corresponds to the end of the first stream.

10. The computer system of claim 9, wherein the first portion begins from a first logical page address associated with a current write pointer in the current I/O request, and wherein the method further comprises:
   setting the current write pointer to an end of the remainder portion; and
   updating, in a data structure, an entry which maps the first logical page address to the current physical page address.

11. The computer system of claim 9, wherein in response to determining that residual data associated with the first stream does not exist in the data buffer, the method further comprises:
   writing, to the data buffer, a second portion of data from the current I/O request to obtain a second page of data, wherein the second portion begins from a second logical page address associated with a current write pointer in the current I/O request;
   writing the remainder portion of the current I/O request to the data buffer to obtain current residual data;
   setting the current write pointer to an end of the remainder portion; and
   updating, in a data structure, an entry which maps the second logical page address to the current physical page address.

12. The computer system of claim 9, wherein subsequent to writing the remainder portion of the current I/O request to the data buffer, the method further comprises:
   sending, to a host computing device from which the first stream of data is received, an acknowledgement that the current I/O request is successful.

13. The computer system of claim 9, wherein a beginning of the remainder portion in the current I/O request corresponds to a third logical page address, and wherein the method further comprises:
   updating, in a data structure, an entry which maps the third logical page address to a next physical page address sequential to the current physical page address.

14. The computer system of claim 9, wherein in response to determining that the current residual data corresponds to the end of the first stream, the method further comprises:
   appending zeros to the current residual data to obtain a third page of data;
   writing the third page of data to the storage device at a next physical page address sequential to the current physical page address;
   updating, in the data structure, an entry which maps a fourth logical page address associated with the current residual data to the next physical page address; and
   clearing the current residual data in the data buffer.

15. The computer system of claim 9, wherein determining whether the current residual data corresponds to the end of the first stream further comprises:
   receiving, by a first microprocessor of the storage device, a command to write the first page of data to the storage device, wherein the first microprocessor retrieves the current physical page address from the data structure;
   executing the command by writing the first page to the storage device at the current physical page address;
   responsive to determining that the second physical page address has been updated and is not null, determining that the current residual data does not correspond to the end of the first stream; and
   responsive to determining that the second physical page address has not been updated, determining that the current residual data corresponds to the end of the first stream.

16. The computer system of claim 15, further comprising:
   reporting whether the residual data corresponds to the end of the first stream.

17. A non-transitory computer-readable storage medium storing instructions that when executed by a computer cause the computer to perform a method, the method comprising:

receiving a first stream of data to be written to a storage device, wherein the first stream includes a plurality of I/O requests associated with data and corresponding metadata;

in response to determining that residual data associated with a preceding I/O request of the first stream exists in a data buffer:
   appending, to the residual data, a first portion of data from a current I/O request to obtain a first page of data;
   writing a remainder portion of the current I/O request to the data buffer to obtain current residual data; and
   writing the first page of data to the storage device at a current physical page address, wherein the current physical page address is retrieved from a data structure based on a logical page address associated with the first page; and determining whether the current residual data corresponds to an end of the first stream, which comprises:
   retrieving, from the data structure, a second physical page address corresponding to a next logical page address associated with a next I/O request;

responsive to determining that the second physical page address is null, setting the second physical page address to an invalid and not null physical page address;

responsive to waiting a predetermined period of time, retrieving the second physical page address from the data structure; and responsive to determining that the second physical page address has been updated and is null, determining that the second physical page address has been trimmed and that the current residual data corresponds to the end of the first stream.

18. The storage medium of claim 17, wherein in response to determining that residual data associated with the first stream does not exist in the data buffer, the method further comprises:

writing, to the data buffer, a second portion of data from the current I/O request to obtain a second page of data, wherein the second portion begins from a second logical page address associated with a current write pointer in the current I/O request;

writing the remainder portion of the current I/O request to the data buffer to obtain current residual data;

setting the current write pointer to an end of the remainder portion; and updating, in a data structure, an entry which maps the second logical page address to the current physical page address.

19. The storage medium of claim 17, wherein in response to determining that the current residual data corresponds to the end of the first stream, the method further comprises:

appending zeros to the current residual data to obtain a third page of data;

writing the third page of data to the storage device at a next physical page address sequential to the current physical page address;

updating, in the data structure, an entry which maps a fourth logical page address associated with the current residual data to the next physical page address; and clearing the current residual data in the data buffer.

20. The storage medium of claim 17, wherein determining whether the current residual data corresponds to the end of the first stream further comprises:

receiving, by a first microprocessor of the storage device, a command to write the first page of data to the storage device, wherein the first microprocessor retrieves the current physical page address from the data structure;

executing the command by writing the first page to the storage device at the current physical page address;

responsive to determining that the second physical page address has been updated and is not null, determining that the current residual data does not correspond to the end of the first stream; and responsive to determining that the second physical page address has not been updated, determining that the current residual data corresponds to the end of the first stream.

* * * * *